United States Patent
Liu et al.

(10) Patent No.: US 7,373,838 B2
(45) Date of Patent: May 20, 2008

(54) ACOUSTIC WAVE FLOW SENSOR FOR HIGH-CONDENSATION APPLICATIONS

(75) Inventors: James Z T Liu, Belvidere, IL (US); Stephen C. Carlson, Roscoe, IL (US); Steven J. Magee, Lena, IL (US)

(73) Assignee: Honeywell International Inc., Morristown, NJ (US)

( * ) Notice: Subject to any disclaimer, the term of this patent is extended or adjusted under 35 U.S.C. 154(b) by 192 days.

(21) Appl. No.: 11/145,625

(22) Filed: Jun. 3, 2005

(65) Prior Publication Data

US 2006/0272416 A1 Dec. 7, 2006

(51) Int. Cl.
G01F 1/66 (2006.01)

(52) U.S. Cl. ............ 73/851.25; 73/25.01; 73/204.11

(58) Field of Classification Search .......... 73/592, 73/204.03, 204.15, 204.11, 204.23, 204.26, 73/204.16, 861.25, 25.01, 204.17, 295; 310/313 R
See application file for complete search history.

(56) References Cited

U.S. PATENT DOCUMENTS

| | | | |
|---|---|---|---|
| 4,361,050 A | 11/1982 | Coussot et al. ............ 73/861.47 |
| 4,548,078 A | 10/1985 | Bohrer et al. ................. 73/204 |
| 4,932,255 A | 6/1990 | Brace et al. | |
| 5,003,822 A | 4/1991 | Joshi | |
| 5,050,429 A | 9/1991 | Nishimoto et al. ....... 73/204.26 |
| 5,476,002 A * | 12/1995 | Bowers et al. ............. 73/24.01 |
| 5,918,258 A * | 6/1999 | Bowers ...................... 73/24.06 |
| 5,992,215 A | 11/1999 | Caron et al. | |
| 6,161,437 A * | 12/2000 | Brennan et al. .............. 73/655 |
| 6,196,070 B1 | 3/2001 | Piascik et al. ............ 73/861.74 |
| 6,308,553 B1 | 10/2001 | Bonne et al. ................. 73/1.35 |
| 6,327,890 B1 * | 12/2001 | Galipeau et al. ........... 73/24.06 |
| 6,363,773 B1 * | 4/2002 | Bowers ...................... 73/24.06 |
| 6,553,808 B2 | 4/2003 | Bonne et al. .............. 73/24.01 |
| 6,681,623 B2 | 1/2004 | Bonne et al. ................. 73/202 |
| 6,715,339 B2 | 4/2004 | Bonne et al. .............. 73/24.01 |
| 6,724,612 B2 | 4/2004 | Davis et al. ................. 361/328 |
| 6,826,966 B1 | 12/2004 | Karbassi et al. .......... 73/861.52 |
| 6,871,537 B1 | 3/2005 | Gehman et al. .......... 73/204.26 |
| 6,886,401 B2 | 5/2005 | Ito et al. ........................ 73/202 |
| 7,127,936 B2 * | 10/2006 | Cardelius et al. ........... 73/24.01 |
| 7,140,261 B2 * | 11/2006 | Liu et al. .................. 73/861.25 |
| 2004/0076081 A1 | 4/2004 | Menzel et al. | |
| 2005/0000281 A1 | 1/2005 | Konzelmann et al. ... 73/204.15 |
| 2006/0032290 A1* | 2/2006 | Liu ........................... 73/29.02 |
| 2007/0068256 A1* | 3/2007 | Xu et al. ....................... 73/597 |

FOREIGN PATENT DOCUMENTS

WO      WO 98/57164      12/1998

* cited by examiner

*Primary Examiner*—Hezron Williams
*Assistant Examiner*—Jacques M. Saint-Surin
(74) *Attorney, Agent, or Firm*—Kermit D. Lopez; Luis M. Ortiz

(57) ABSTRACT

An acoustic wave flow sensor includes a piezoelectric substrate and a heater located immediately below the acoustic wave substrate. A heating element can be deposited in association with a plurality of acoustic wave components upon the acoustic wave substrate. The acoustic wave components, the piezoelectric substrate, the heater and the heating element operate in a high-condensation environment, such that the plurality of acoustic wave components are heated directly by the heater and/or the heating element, thereby promoting a desorption of water in the high-condensation environment in order to achieve accurate and reliable flow sensing data thereof.

18 Claims, 1 Drawing Sheet

ACOUSTIC WAVE FLOW SENSOR FOR HIGH-CONDENSATION APPLICATIONS

TECHNICAL FIELD

Embodiments are generally related to sensing devices and components thereof. Embodiments also relate to acoustic wave devices. Embodiments also relate to flow sensors utilized in high condensation applications.

BACKGROUND OF THE INVENTION

Acoustic wave sensors are utilized in a variety of sensing applications, such as, for example, temperature and/or pressure sensing devices and systems. Acoustic wave devices have been in commercial use for over sixty years. Although the telecommunications industry is the largest user of acoustic wave devices, they are also used for sensor applications, e.g., in chemical vapor detection. Acoustic wave sensors are so named because they use a mechanical, or acoustic, wave as the sensing mechanism. As the acoustic wave propagates through or on the surface of the material, any changes to the propagation path affect the characteristics of the wave.

Changes in acoustic wave characteristics can be monitored by measuring the frequency or phase characteristics of the sensor and can then be correlated to the corresponding physical quantity or chemical quantity that is being measured. Virtually all acoustic wave devices and sensors utilize a piezoelectric substrate to generate the acoustic wave. Three mechanisms can contribute to acoustic wave sensor response, i.e., mass-loading, visco-elastic and acousto-electric effect. The mass-loading of chemicals alters the frequency, amplitude, and phase and Q value of such sensors. Most acoustic wave chemical detection sensors, for example, rely on the mass sensitivity of the sensor in conjunction with a chemically selective coating that absorbs the vapors of interest resulting in an increased mass loading of the acoustic wave sensor.

Examples of acoustic wave sensors include acoustic wave detection devices, which are utilized to detect the presence of substances, such as chemicals, or environmental conditions such as temperature and pressure. An acoustical or acoustic wave (e.g., SAW/BAW) device acting as a sensor can provide a highly sensitive detection mechanism due to the high sensitivity to surface loading and the low noise, which results from their intrinsic high Q factor. Surface acoustic wave devices are typically fabricated using photolithographic techniques with comb-like interdigital transducers placed on a piezoelectric material. Surface acoustic wave devices may have either a delay line or a resonator configuration. Bulk acoustic wave devices are typically fabricated using a vacuum plater, such as those made by CHA, Transat or Saunder. The choice of the electrode materials and the thickness of the electrode are controlled by filament temperature and total heating time. The size and shape of electrodes are defined by proper use of masks.

One area where it is believed that acoustic wave devices can offer significant improvements is in the area of flow sensors. Flow sensors are utilized in a variety of fluid-sensing applications for detecting the quantity of fluids, including gas and liquid. Thermal sensors of such fluids, which detect the fluid flow or property of fluid, can be implemented, for example, as sensors on silicon in microstructure form. For convenience sake, and without limitation, the term "flow sensor" can be utilized to refer generically to such thermal sensors. The reader will appreciate that such sensors are also generally utilized to measure primary properties such as temperature, thermal conductivity, specific heat and other properties, and that the flows may be generated through forced or natural convection.

Conventional thermal-conductivity based flow sensors typically utilize a by-pass design for some high-flow applications. Such a configuration increases costs and the complexity of the sensing design, particularly in the context of a high-condensation environment. Additionally, the use of a by-pass may cool down the high-humidity air and the condensed water may clog the by-pass and cause the sensor to malfunction.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved sensing device.

It is another aspect of the present invention to provide for an improved flow sensor It is yet another aspect of the present invention to provide for a flow sensor incorporating acoustic wave components in association with one or more heating elements and/or a heater.

It is a further aspect of the present invention to provide for an acoustic wave flow sensor for high-condensation sensing applications.

The aforementioned aspects and other objectives and advantages can now be achieved as described herein. An acoustic wave flow sensor is disclosed, which includes an acoustic wave substrate and a heater located immediately below the acoustic wave substrate. A heating element can be deposited in association with a plurality of acoustic wave components upon the acoustic wave substrate. The acoustic wave components, the acoustic wave substrate, the heater and the heating element operate in a high-condensation environment, such that the plurality of acoustic wave components are heated directly by the heater and/or the heating element, thereby promoting a desorption of water in the high-condensation environment in order to achieve accurate and reliable flow sensing data thereof.

Desorption of water can be accomplished through the heater or the heating element and/or through a release of heat from at least one of the plurality of acoustic wave components. The acoustic wave components can comprise at least one interdigital transducer (IDT), while the acoustic wave substrate can be configured as a piezoelectric substrate. The acoustic wave components can be, for example amplitude plate mode (APM), shear horizontal surface acoustic wave (SH-SAW) or surface acoustic wave (SAW) components, depending upon design considerations.

It is therefore one aspect of the embodiments to use an acoustic wave based sensor module to measure fluid flow. A transducer converts an input electrical signal to an acoustic signal. The acoustic wave traverses the substrate to another transducer where it is converted into an electrical signal. A heater is also formed on the substrate. The heater can be configured from a metal other than that used for the acoustic wave transducers, requiring extra photolithographic processing. Furthermore, a heater is typically powered using a DC electric power source. The sensor module is powered and communicates with external electrical circuitry by means of a wired connection.

It is a further aspect of the embodiments to make the heater from the same material as the transducers and form the heater during the same processing steps that form the transducers. Heaters are commonly configured from different materials and are attached or formed in heater specific processing steps. The reason this is so is that some materials make ideal heaters and others make ideal transducers. A transducer material, however, can be formed into an adequate heater with the advantage of reduced cost.

It is also another aspect of the embodiments to use the upstream acoustic wave transducer, downstream acoustic wave transducer, or both as a heater. This is possible because an acoustic wave transducer reacts differently to different input signals. Some signals will be efficiently converted into acoustic signals. Other signals will not. All signals carry energy. Electrical energy that enters an acoustic wave transducer is converted into either acoustic energy or heat. A signal that is not efficiently converted into an acoustic signal causes the transducer to heat up. An acoustic wave transducer can be supplied with many signals at the same time. If at least one of the signals is converted to heat, then the acoustic wave transducer acts as a heater. The other signals can be efficiently converted into acoustic signals. The SAW transducer therefore functions as both a transducer and a heater.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
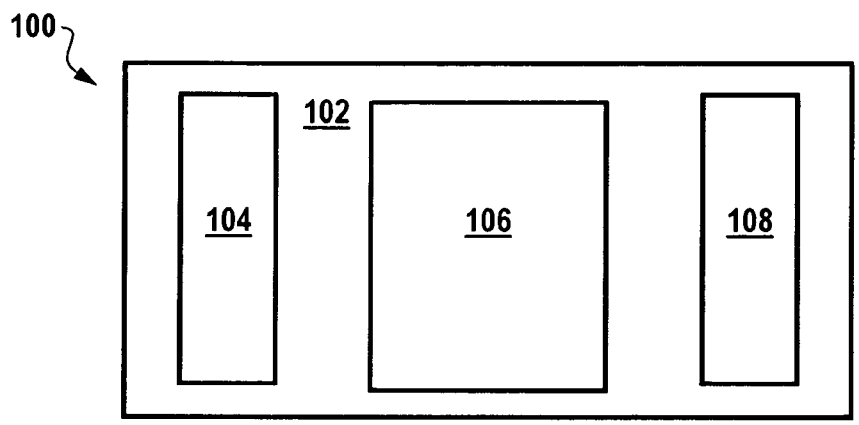
FIG. 1 illustrates a block diagram of an acoustic wave flow sensor that can be implemented in accordance with one embodiment.

FIG. 1 illustrates a block diagram of an acoustic wave flow sensor 100 that can be implemented in accordance with one embodiment. Acoustic wave flow sensor 100 generally includes a heater 106 formed upon a substrate 102. An acoustic wave temperature sensing component 104 is also formed upon substrate 102 in association with another temperature sensing component 108.

Figure 2:
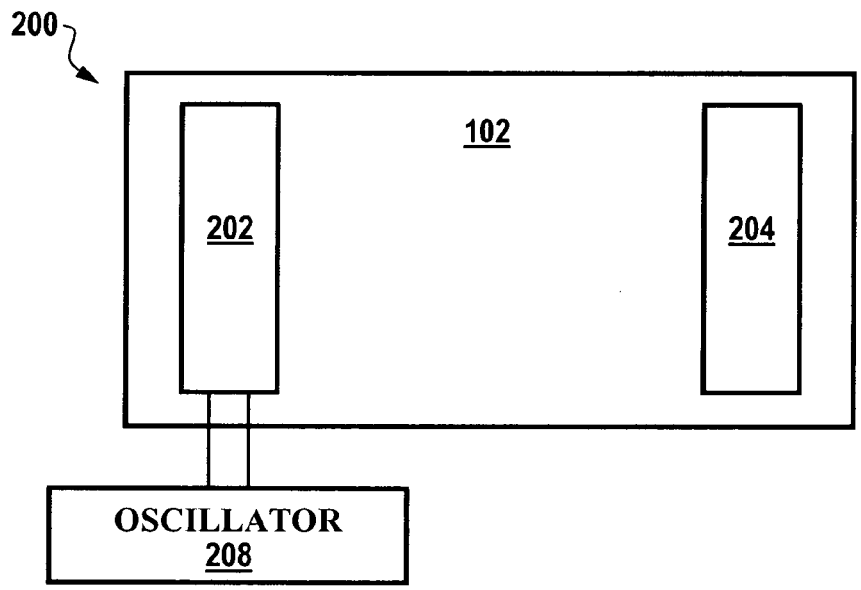
FIG. 2 illustrates a block diagram of an acoustic wave flow sensor that can be implemented in accordance with another embodiment.

FIG. 2 illustrates a block diagram of an acoustic wave flow sensor 200 that can be implemented in accordance with another embodiment. Note that in FIGS. 1-3, identical or similar parts or elements are generally indicated by identical reference numerals. Acoustic wave flow sensor 200 generally includes an acoustic wave resonator 202, which is connected to a high-power oscillator 208. Additionally, an acoustic wave temperature sensing component 204 is disposed on substrate 102 in association with the acoustic wave resonator 202.

Figure 3:
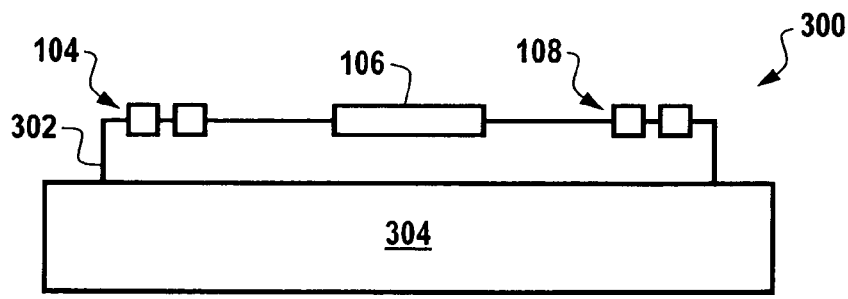
FIG. 3 illustrates a block diagram of an acoustic wave flow sensor that can be implemented in accordance with a preferred embodiment.

FIG. 3 illustrates a block diagram of an acoustic wave flow sensor 300 that can be implemented in accordance with a preferred embodiment. In general, acoustic wave temperature sensing components 104 and 106 can be configured upon an acoustic wave substrate 302. The heating element 104 generally functions as a flow sensor heater and is also configured upon the acoustic wave substrate 302. A heater 304 is generally formed below the acoustic wave substrate 302. In the configuration depicted in FIG. 3, sensor 300 is utilized in the context of high-condensation sensing applications. The acoustic wave flow sensor 300 depicted in FIG. 3, along with sensors 100-200 respectively illustrated in FIG. 1-2, provide for an extremely high dynamic range in comparison to semiconductor-based sensing devices. Thus, sensors 100-300 do not require a by-pass component. The desorption of condensed water in a high-condensation environment can be accomplished through the use of heater 302 and/or heating element 104 or heat released from the IDT's 104, 108. Note that IDT's 104, 108 depicted in FIGS. 1-3 be formed from copper. The use of copper can prevent or at least minimize acoustic-migration issues.

Note that acoustic wave substrate 302 depicted in FIG. 3 is analogous to substrate 102 depicted in FIGS. 1-2. With this in mind, it can be appreciated that substrate 302 can be provided as a piezoelectric substrate and may be formed from a variety of substrate materials, such as, for example, quartz, lithium niobate ($LiNbO_3$), lithium tantalite ($LiTaO_3$), $Li_2B_4O_7$, $GaPO_4$, langasite ($La_3Ga_5SiO_{14}$), ZnO, and/or epitaxially grown nitrides such as Al, Ga or Ln, to name a few.

The acoustic wave temperature sensing components 102 and 106 each comprise interdigital transducers (e.g., electrodes) and can be formed from materials, which are generally divided into three groups. First, IDT or electrodes 104, 108 can be formed from a metal group material (e.g., Al, Pt, Au, Rh, Ir Cu, Ti, W, Cr, or Ni). Second, IDT or electrodes 104, 108 can be formed from alloys such as NiCr or CuAl. Third, IDT or electrodes 104, 108 can be formed from metal-nonmetal compounds (e.g., ceramic electrodes based on TiN, $CoSi_2$, or WC).

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. An acoustic wave flow sensor, comprising:
   a piezoelectric substrate;
   a heater located immediately below said acoustic wave substrate; and
   a heating element deposited in association with a plurality of acoustic wave components upon said piezoelectric substrate, wherein said plurality of said acoustic wave components, said piezoelectric substrate, said heater and said heating element operate in a high-condensation environment, such that said plurality of acoustic wave components are heated directly by said heater and said heating element, thereby promoting a desorption of water in said high-condensation environment in order to achieve accurate and reliable flow sensing data thereof.

2. The sensor of claim 1 wherein said desorption of water is accomplished through said heater or said heating element.

3. The sensor of claim 1 wherein said desorption of water is accomplished through a release of heat from at least one of said plurality of acoustic wave components.

4. The sensor of claim 1 wherein said plurality of acoustic wave components comprises at least one interdigital transducer (IDT).

5. The sensor of claim 4 wherein said at least one IDT comprises copper, gold or platinum in order to reduce acoustic-migration issues associated with said sensor.

6. The sensor of claim 1 wherein said piezoelectric substrate comprises a tem perature-sensitive piezoelectric substrate.

7. The sensor of claim 1 wherein said plurality of acoustic wave components comprises at least one amplitude plate mode (APM) component.

8. The sensor of claim 1 wherein said plurality of acoustic wave components comprises at least one surface acoustic wave (SAW) component.

9. The sensor of claim 1 wherein said plurality of acoustic wave components comprises at least one shear horizontal surface acoustic wave (SH-SAW) component.

10. The fluid flow sensor module of claim 9 further comprising a film or layer for producing guided SH-SAW acoustic waves.

11. The fluid flow sensor module of claim 5 wherein said heater comprises an identical material utilized to form said at least one IDT.

12. A fluid flow sensor module comprising:
a piezoelectric substrate;
a heater located immediately below said acoustic wave substrate; and
a heating element deposited in association with a plurality of acoustic wave components upon said piezoelectric substrate, wherein said plurality of acoustic wave components comprises at least one interdigital transducer (IDT) and wherein said plurality of said acoustic wave components, said piezoelectric substrate, said heater and said heating element operate in a high-condensation environment, such that said plurality of acoustic wave components are heated directly by said heater and said heating element, thereby promoting a desorption of water in said high-condensation environment in order to achieve accurate and reliable flow sensing data thereof, wherein said desorption of water is accomplished through said heater or said heating element or said desorption of water is accomplished through a release of heat from at least one of said plurality of acoustic wave components.

13. The sensor of claim 12 wherein said piezoelectric substrate comprises a temperature-sensitive piezoelectric substrate.

14. The sensor of claim 12 wherein said at least one IDT comprises copper, gold or platinum in order to reduce acoustic-migration issues associated with said sensor.

15. The sensor of claim 12 wherein said heater comprises an identical material utilized to form said at least one IDT.

16. An acoustic wave flow sensor, comprising:
a piezoelectric substrate;
a heater located immediately below said acoustic wave substrate; and
a heating element deposited in association with at least one IDT upon said piezoelectric substrate, wherein said plurality of said acoustic wave components, said piezoelectric substrate, said heater and said heating element operate in a high-condensation environment, such that said at least one IDT is heated directly by said heater and said heating element, thereby promoting a desorption of water in said high-condensation environment in order to achieve accurate and reliable flow sensing data thereof;
wherein said desorption of water is accomplished through said heater or said heating element and wherein said desorption of water is accomplished through a release of heat from at least one of said at least one IDT; and
wherein said at least one IDT comprises copper, gold or platinum in order to reduce acoustic-migration issues associated with said sensor and wherein said piezoelectric substrate comprises a temperature-sensitive piezoelectric substrate.

17. The sensor of claim 16 wherein said at least one IDT comprises an input acoustic wave transducer and an output acoustic wave transducer.

18. The sensor of claim 17 wherein at least one of said input acoustic wave transducer or said output acoustic wave transducer comprises at least one surface acoustic wave (SAW) component in association with a heater and a heater control circuit, such that when said SAW component ceases oscillation due to water condensed on a surface of said at least one IDT, said heater control circuit activates said heater for heating operations thereof.

* * * * *